(12) United States Patent
Lin et al.

(10) Patent No.: US 9,541,921 B2
(45) Date of Patent: Jan. 10, 2017

(54) MEASURING PERFORMANCE OF AN APPLIANCE

(71) Applicant: INTERNATIONAL BUSINESS MACHINES CORPORATION, Armonk, NY (US)

(72) Inventors: Ta-Wei Lin, Taipei (TW); Jeffrey CH Liu, Taipei (TW); Lin Chan Hsiao, Taipei (TW); Shu-Hao Liang, Taipei County (TW); Chih-Wen Su, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 13/731,093

(22) Filed: Dec. 30, 2012

(65) Prior Publication Data

US 2013/0173219 A1    Jul. 4, 2013

(30) Foreign Application Priority Data

Dec. 30, 2011    (TW) .............................. 100150086 A (51) Int. Cl.
  *G05B 23/02*    (2006.01)
  *G06F 11/34*    (2006.01)

(52) U.S. Cl.
  CPC ....... *G05B 23/0202* (2013.01); *G06F 11/3409* (2013.01); *G06F 11/3466* (2013.01)

(58) Field of Classification Search
  CPC .. H04L 12/2697; H04L 67/02; H04L 43/0876; H04L 67/10; H04L 67/1002; G06F 9/45558; G06F 11/3495; G06F 2009/45579; G06F 2201/87

(Continued)

(56) References Cited

U.S. PATENT DOCUMENTS 4,597,082 A  *  6/1986  Hill .......................... H04B 3/56
                                                              375/222
4,625,081 A  *  11/1986  Lotito ............... H04M 3/53316
                                                              379/196

(Continued)

OTHER PUBLICATIONS

Malone, Steven J., Non-Final Office Action, U.S. Appl. No. 13/781,736, The United States Patent and Trademark Office, Jul. 9, 2014.

(Continued)

*Primary Examiner* — Toan Le
*Assistant Examiner* — Jeffrey Aiello
(74) *Attorney, Agent, or Firm* — Yudell Isidore PLLC (57) ABSTRACT

A computer program product and apparatus measure performance of an information appliance. The computer program product comprises code for: a test module receiving, from a client, and recording a request for processing of a sample data by an information appliance. The test module sends the sample data received from the client to the information appliance for processing. If a request to a backend application is present, the test module also sends the request to the backend application for processing and receives and records a response from the backend application. The test module sends the response from the backend application to the information appliance for processing. A generated correlation ID is used to update a performance data table with start time and a stop time of a response for transaction sample data processed by the information appliance.

20 Claims, 7 Drawing Sheets

(58) Field of Classification Search
USPC .......... 702/186, 182, 61; 709/224, 203, 213;
707/E17.014, E17.005
See application file for complete search history.

(56) References Cited

U.S. PATENT DOCUMENTS

| | | | | |
|---|---|---|---|---|
| 4,866,429 | A * | 9/1989 | Granere | B21D 55/00 340/665 |
| 6,701,363 | B1 * | 3/2004 | Chiu | H04L 12/2602 380/255 |
| 7,552,445 | B2 * | 6/2009 | Green | G06F 11/3006 709/224 |
| 7,685,083 | B2 * | 3/2010 | Fairweather | G06F 8/427 706/45 |
| 7,809,525 | B2 * | 10/2010 | Chagoly | G06F 11/3006 702/182 |
| 8,380,820 | B1 * | 2/2013 | Kumarjiguda | H04L 29/08099 709/219 |
| 2004/0019894 | A1 * | 1/2004 | Willard | G06F 11/3495 719/317 |
| 2006/0167891 | A1 * | 7/2006 | Blaisdell | G06F 11/3495 |
| 2006/0206246 | A1 * | 9/2006 | Walker | G06Q 10/00 701/16 |
| 2008/0049775 | A1 | 2/2008 | Morrill et al. | |
| 2008/0126413 | A1 * | 5/2008 | Addleman | G06F 11/0709 |
| 2008/0215664 | A1 * | 9/2008 | Dibbern | H04L 67/14 709/202 |
| 2008/0222107 | A1 * | 9/2008 | Maluf | G06F 17/30893 707/E17.014 |
| 2008/0288581 | A1 * | 11/2008 | Schneider | H04L 67/02 709/203 |
| 2009/0313438 | A1 * | 12/2009 | Krishnaprasad | G06F 12/0813 711/133 |
| 2010/0034100 | A1 | 2/2010 | Beyers | |
| 2010/0046377 | A1 * | 2/2010 | Ryan | H04L 41/0681 370/241 |
| 2010/0322089 | A1 * | 12/2010 | Raja | H04L 41/5009 370/252 |
| 2010/0322237 | A1 * | 12/2010 | Raja | H04L 63/1433 370/389 |
| 2010/0325588 | A1 * | 12/2010 | Reddy | G06F 3/048 715/853 |
| 2011/0231730 | A1 * | 9/2011 | Allen | G06F 11/106 714/758 |
| 2013/0067018 | A1 * | 3/2013 | Reynolds | H04L 12/6418 709/212 |
| 2013/0201316 | A1 * | 8/2013 | Binder | H04L 67/12 348/77 |

OTHER PUBLICATIONS

Malone, Steven J., Final Office Action, U.S. Appl. No. 13/781,736, The United States Patent and Trademark Office, Mar. 27, 2015.
Malone, Steven J., Non-Final Office Action, U.S. Appl. No. 13/781,736, The United States Patent and Trademark Office, Sep. 23, 2015.
Malone, Steven J., Final Office Action, U.S. Appl. No. 13/781,736, The United States Patent and Trademark Office, Jun. 27, 2016.

* cited by examiner

MEASURING PERFORMANCE OF AN APPLIANCE

PRIORITY CLAIM

This application is based on and claims the benefit of priority from Taiwan Patent Application 100150086, filed on Dec. 30, 2011.

BACKGROUND OF THE INVENTION

1. Technical Field

The present invention relates to information appliance performance measurement technology, and more particularly, to a method and apparatus for measuring the performance of an information appliance by means of a SoC (system-on-card) calculation unit.

2. Description of the Prior Art

Unlike general-purpose computer devices, an appliance is typically designed to serve a specific purpose or provide a specific service and thus is more robust. Compared with general-purpose computer devices, "appliances" are relatively "closed"—their specific operating systems and applications (or drivers) vary with their intended purposes and services.

An appliance, such as an access point, a digital TV set-top box, or a network file-sharing server, performs a specific transaction for serving a specific purpose. For sophisticated appliances, please refer to IBM® WebSphere® DataPower Series SOA Appliances or Tivoli® ISS Appliances® ("IBM," "WebSphere," and "Tivoli" are registered trademarks in the possession of International Business Machine in the United States and/or other countries).

In general, an information appliance can function as a reverse proxy capable of load balance, cache and data encryption, and adapted to send data from a user-end to a backend application on a network server at a back-end. One of the most frequently asked questions is about how to evaluate a transaction system achieving maximum throughout (transaction quantity per second.) However, the performance of an information appliance depends on the overall performance of the transaction system infrastructure and the payload of an input message. Thus, the performance of a series of systems equals that of the weakest one of the systems. If an infrastructure architecture does not match the performance of the information appliance, then the performance of the information appliance cannot be actually measured during a test. As a result, the performance of the information appliance cannot be assessed until the infrastructure architecture similar to a target environment is created. Thus, the construction process of the infrastructure architecture for use in performance testing is time-consuming and resource-consuming.

Hence, it is desirable to provide a solution that receives input samples for a client but dispenses with creating an infrastructure architecture of performance testing. Furthermore, the solution should be configured such that if an information appliance simulates dynamic states (such as packet loss and latency) of the infrastructure architecture, measurement results will approximate to a measured value in the clients' actual environment.

SUMMARY OF THE INVENTION

The present invention provides a mechanism for measuring the performance of an information appliance without creating an infrastructure architecture required for performance testing. In another embodiment thereof, the present invention provides a system-on-card comprising a stand-alone performance measurement system (SPMS). The system-on-card can be inserted into a high-speed serial bus (such as a PCI-e) inside the information appliance. In one embodiment of the present invention, receiving and transmitting operations taking place on the information appliance are simulated by means of the system-on-card which can be inserted into a high-speed serial bus inside the information appliance and virtual network interface technology so as to test the performance of the information appliance. The system-on-card comprises a dedicated central processing unit, an input/output unit, and a memory. The memory comprises a test module of the present invention. Excluding a power source and an internal bus, the system-on-card does not occupy any resources of the information appliance. The system-on-card is inserted into a typical standard serial bus and thus does not require any specific modification and configuration. Since a PCI-e bus requires a bandwidth much larger than the throughout (the PCI-e bus supports 128 Gbps) of a typical network interface, the overall performance of the information appliance remains unaffected. The present invention also applies to other high-speed buses, such as Serial AT Attachment (SATA), Universal Serial Bus (USB), Serial Attached Small Computer System Interface (SAS), or RapidIO.

According to another embodiment of the present invention, an information appliance comprises: an input/output (I/O) bus; a standalone performance measurement system connected to the input/output (I/O) bus, the standalone performance measurement system comprising: a bus; a memory connected to the bus, wherein the memory comprises a command; a processing unit connected to the bus, wherein the processing unit executes the command for executing the aforesaid method.

According to another embodiment of the present invention, a system-on-card comprises: a bus; a memory connected to the bus, wherein the memory comprises a command; and a processing unit connected to the bus, wherein the processing unit executes the command for executing the aforesaid method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Described herein are a method, information appliance, and computer program product for measuring the performance of an information appliance without creating an infrastructure architecture required for performance testing. Accordingly, the present invention may take the form of an entirely hardware embodiment, a processor-executable software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 5B, appliances, methods, and computer program products are illustrated as structural or functional block diagrams or process flowcharts according to various embodiments of the present invention. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
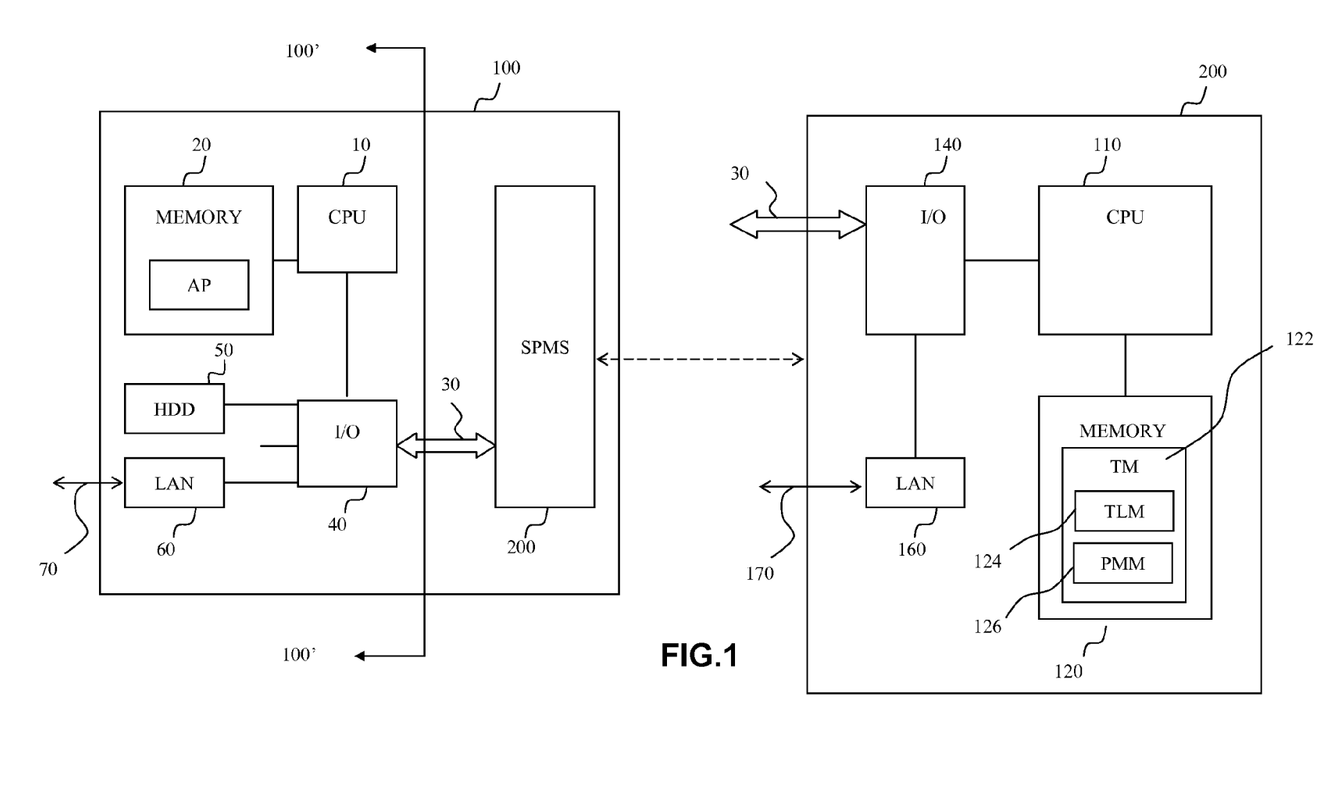
FIG. 1 is a block diagram of an information appliance and a system-on-card comprising a standalone performance measurement system (SPMS) according to an exemplary embodiment of the present invention.

Referring to FIG. 1, there is a schematic block diagram of an information appliance 100 and a system-on-card 200 comprising a standalone performance measurement system (SPMS) according to an exemplary embodiment of the present invention. In an embodiment, the information appliance 100 is of a hardware architecture of IBM® WebSphere® DataPower Series SOA Appliances, or Tivoli® ISS Appliances®.

In an exemplary embodiment, the appliance 100 includes: a processor for executing various applications; a storage device for storing various information and program code; a display device, a communication device, and an input/output device which function as interfaces for communicating with a user; and a peripheral component or other components serving a specific purpose. In another embodiment, the present invention is implemented in another way having less or more other devices or components. The network can also be implemented in any form of a connection, including a fixed connection, such as a local area network (LAN) or a wide area network (WAN), or via the Internet through a dial-up connection provided by an Internet service provider (ISP). The network connection is not restricted to cable connection and wireless connection; instead, it can also be implemented by wireless connection in the form of a GSM connection or a Wi-Fi connection for communicating with a client computer. The network further comprises other hardware and software components (not shown), such as an additional computer system, router, and firewall.

Referring to FIG. 1, the information appliance 100 comprises a processor 10, a memory 20, an input/output (I/O) unit 40, and the system-on-card 200. The system-on-card 200 is coupled to the input/output (I/O) unit 40 via an input/output (I/O) bus 30. The input/output (I/O) bus 30 is a high-speed serial bus, such as a PCI-e bus or any other bus structure. It is also feasible for the input/output (I/O) bus 30 to be directly connected in any other ways such as by interconnected components or an additional card. The input/output (I/O) unit 40 can also be coupled to a hard disk drive 50 or a local area network (LAN) adapter 60. With the LAN adapter 60, the information appliance 100 communicates with a user-end computer via a network cable 70 and a network (not shown). The memory 20 is any of: a random access memory (RAM), a read-only memory (ROM), or an erasable programmable read-only memory (EPROM or Flash memory). Memory 20 stores an operating system, a program code of a dedicated application AP, and various other information. An operating system is executed on the processor 10 to coordinate and provide various component controls in the information appliance 100. The processor 10 accesses the memory 20 so as to execute application AP.

Persons skilled in the art understand that the hardware of the information appliance 100 depicted in FIG. 1 varies from embodiment to embodiment. Also, other internal hardware or peripheral devices, such as a Flash ROM, an equivalent non-volatile memory, or a CD-ROM, can be added to or substituted for the hardware shown in FIG. 1.

Referring to FIG. 1, the system-on-card 200 comprises a dedicated processor 110, a memory 120, an input/output (I/O) unit 140, and an operating system (not shown). The system-on-card 200 further comprises a local area network (LAN) adapter 160. Using the LAN adapter 160, the system-on-card 200 communicates with an external device (such as a user-end computer) via a network cable 170. System-on-card 200 is connected to the input/output (I/O) bus 30 of the information appliance 100 as soon as an additional card for use with a network device of the information appliance 100 is inserted into an expansion slot (not shown) of the information appliance 100. The memory 120 contains a program code of a test module (TM) 122. The processor 110 accesses the memory 120 to execute the test module (TM) 122 for performing a performance testing of the information appliance 100. The test module (TM) 122 comprises a traffic loading module (TLM) 124 for not only collecting recording the traffic, but also for creating and storing a traffic data table (TDT) (e.g., TDT 350 of FIG. 3A-B). The test module (TM) 122 further comprises a performance measurement module (PMM) 126 for performing a performance testing and also creating and storing a performance data table (PDT) (e.g., PDT 560 of FIG. 5A-B). More details of the traffic loading module 124 and the performance measurement module 126 are described below. The test module 122 further comprises a sending module and a receiving module (not shown).

Figure 2:
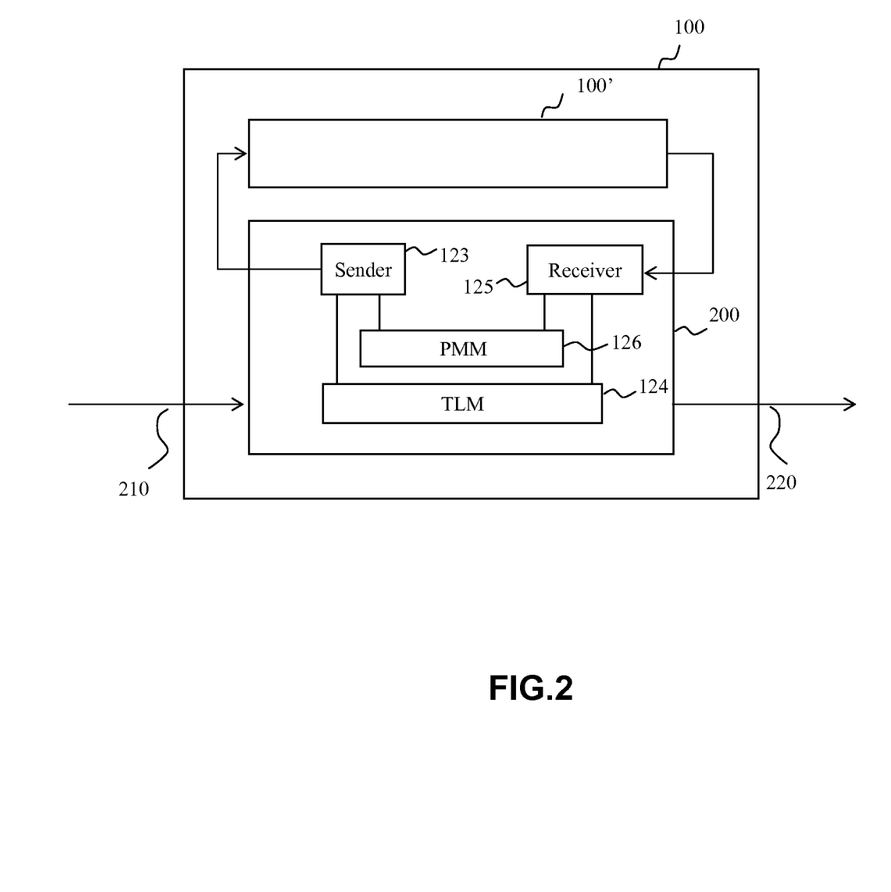
FIG. 2 is a block diagram of message delivery during the execution of a traffic loading module according to an embodiment of the present invention.

According to an embodiment of the present invention, a system-on-card 200 comprising the standalone performance measurement system (SPMS) first has to collect a sample data for use in a test. Referring to FIG. 2, there is shown a schematic view of message delivery during the execution of the traffic loading module 124 according to a specific embodiment of the present invention.

During a recording mode, the traffic loading module 124 directly receives and records a sample data sent from a client end, using a network input cable 210 of the LAN adapter 160 of the system-on-card 200, and then a sending module (or referred to as a sender) 123 of the test module 122 sends the sample data to a partial information to appliance 100' via the input/output (I/O) bus 30. The sample data is processed by the partial information appliance 100' and the processing result is sent via the input/output (I/O) bus 30 to a receiving module (or referred to as a receiver) 125 of the test module 122, thereby allowing the receiving module 125 to receive and record the result. If a request to a backend application (or referred to as a backend) is present, the request of the backend application is recorded and then sent to the backend application via a network output cable 220.

Likewise, the traffic loading module 124 also receives, via network input cable 210, and records a response of the processing result of the backend application, and then the processing result is sent from the sending module (or referred to as a sender) 123 to the partial information appliance 100' under test for processing. The processing result is sent back to the receiving module 125 of the test module 122 and receiving module 125 receives and records the result. The result is sent to the client end via network output cable 220.

The aforesaid sample data, the processing result of the partial information appliance 100', a request and processing result of the backend application are recorded and stored in a traffic data table (TDT) 350. According to an embodiment of the present invention, the traffic data table (TDT) 350 is stored in the memory 120 of the system-on-card 200 for instant use in measuring the performance of the partial information appliance 100', but the present invention is not limited thereto. In another embodiment, the traffic data table (TDT) 350 is stored in the memory 20 of the partial information appliance 100'. To begin a test, the system-on-card 200 directly accesses or loads the memory 120 of the system-on-card 200 via the high-speed input/output (I/O) bus 30. More details of the traffic loading module 124 and the traffic data table (TDT) 350, are provided within FIG. 3A and FIG. 3B and the description thereof.

Since the input/output (I/O) bus 30 of the present invention is a high-speed serial bus, such as a PCI-e bus, its bandwidth is much larger than the throughout (PCI-e bus supports 128 Gbps) of a typical network interface, the overall performance of the information appliance remains unaffected.

In another embodiment, the sample data thus collected and processed can be received by the partial information appliance 100' rather than directly fed into the system-on-card 200; meanwhile, the sample data thus received and its subsequent processing result can be directly recorded and stored in the memory 20 of the partial information appliance 100', the memory 120 of the system-on-card 200, or both, for use in a subsequent testing stage (that is, in a testing mode). To store them in the memory 120 of the system-on-card 200, it is necessary to amend the dedicated application AP initially present in the partial information appliance 100', such that it can store the aforesaid data in the memory 120 of the system-on-card 200.

Figure 3A:
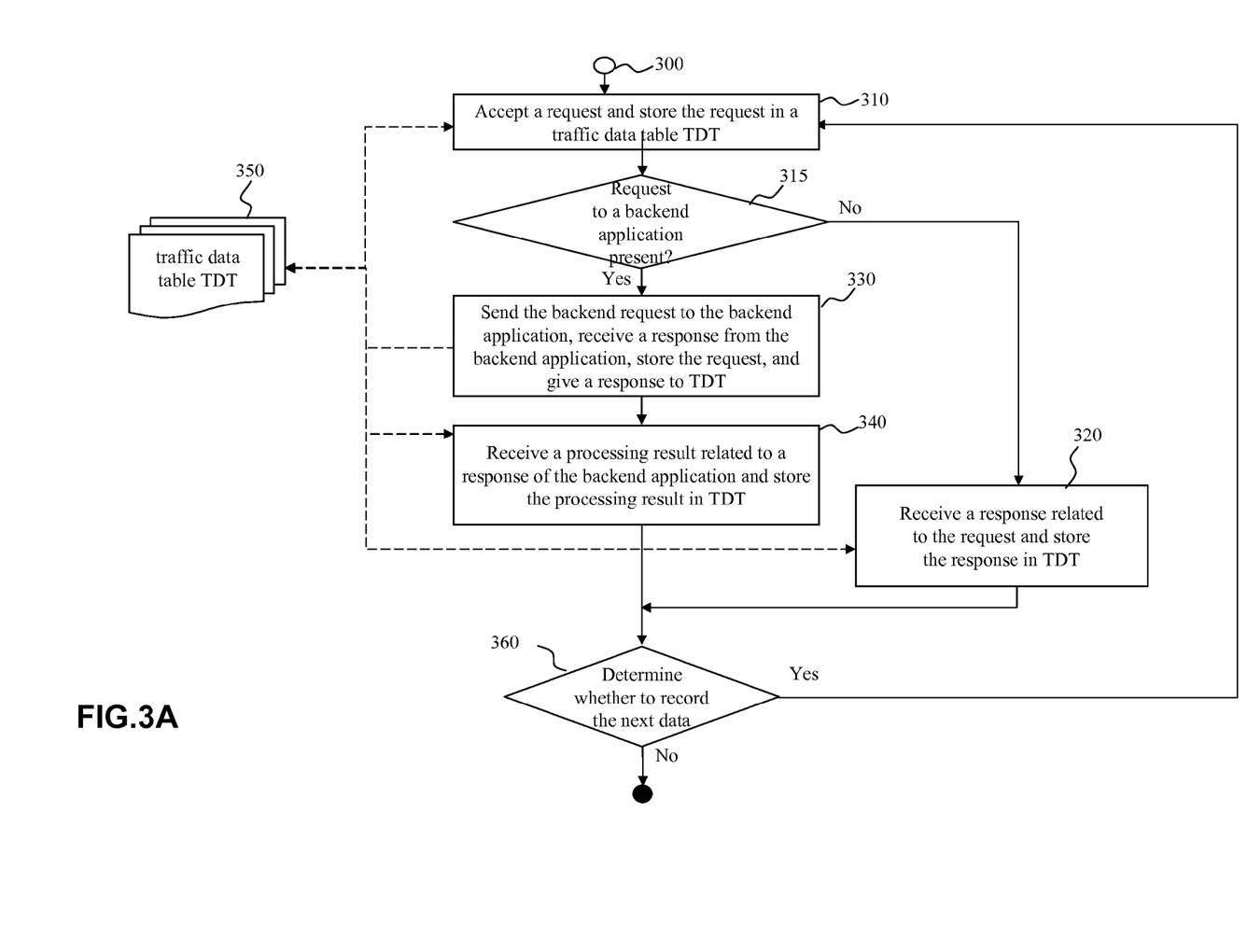
FIG. 3A is a flow chart of a method for use with a traffic loading module in a recording mode according to an embodiment of the present invention.
Figure 3B:
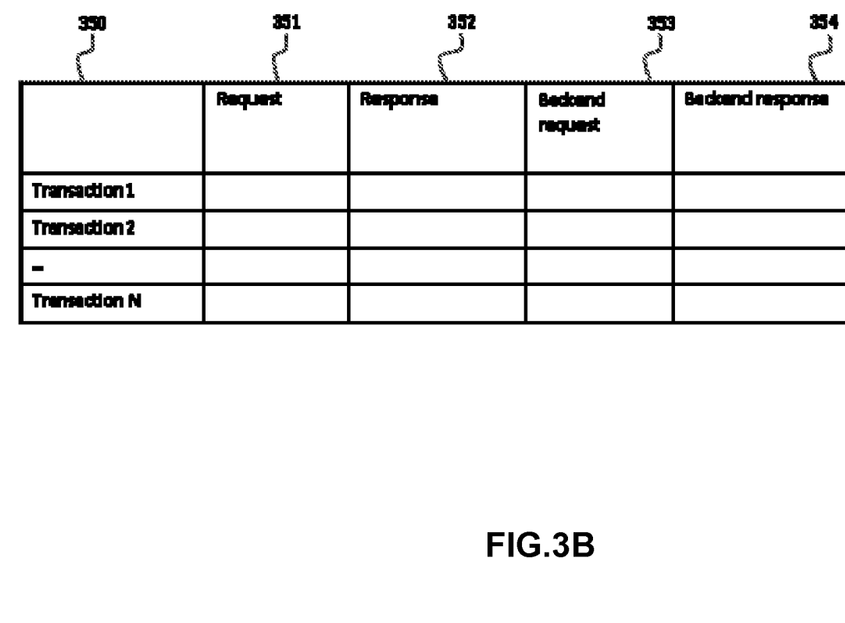
FIG. 3B is an exemplary traffic data table (TDT) created by and stored in the traffic loading module according to an embodiment of the present invention.

FIG. 3A is a flow chart of a method for use with the traffic loading module 124 in the recording mode according to an embodiment of the present invention. FIG. 3B is a traffic data table (TDT) 350 created by and stored in the traffic loading module 124. After initiator block 300, the process moves to step 310 where the traffic loading module 124 receives and records a request (such as REQUEST) related to a sample data and sent from a client end, and stores the request in a traffic data table (TDT) 350. As described above, the traffic data table (TDT) 350 is stored in the memory 120 of the system-on-card 200 or stored in the memory 20 of the partial information appliance 100'. Next, it is determined whether a request to a backend application is present (step 315).

If it is determined that no request to a backend application is present, the process flow of the method involves receiving a response, recording and storing in the traffic data table (TDT) 350 a result (such as RESPONSE) of the processing process performed by the partial information appliance 100' and related to the request (step 320).

If it is determined that a request to a backend application is present, the process flow of the method involves recording and storing a request (such as BACKEND REQUEST) to the backend application in the traffic data table (TDT) 350, sending a request of the backend application to the backend application, receiving a response from the backend application, and recording and storing a result (such as BACKEND RESPONSE) of the processing of the backend application in the traffic data table (TDT) 350 (Step 330).

At step 340 the result of the processing of the backend application is still sent by the sending module 123 to the partial information appliance 100' under test for processing. The processing result is still sent back to the receiving module 125 of the test module 122. The result (such as RESPONSE) is received and recorded by the receiving module 125 of the test module 122, and then stored in the traffic data table (TDT) 350. The result is sent to the client end via the network output cable 220.

At step 360 it is determined whether a request from the client end for the next sample data is present. The process continues to step 310 when the determination is affirmative. The recording mode is ended when the determination is negative and the process terminates.

All the aforesaid data (such as REQUEST, RESPONSE, BACKEND REQUEST and, BACKEND RESPONSE) are stored in a traffic data table (TDT) 350 and intended for use in the testing mode. In addition to their contents, the data comprises at least data size. In fact, the traffic data table (TDT) 350 may merely comprise REQUEST and BACKEND RESPONSE for use by a performance measurement module but does not need to record RESPONSE and BACKEND REQUEST.

According to an embodiment of the present invention, in the testing mode, the system-on-card 200 comprising the standalone performance measurement system (SPMS) tests the performance of the partial information appliance 100' by means of the transaction data put in the traffic data table (TDT) 350.

Figure 4:
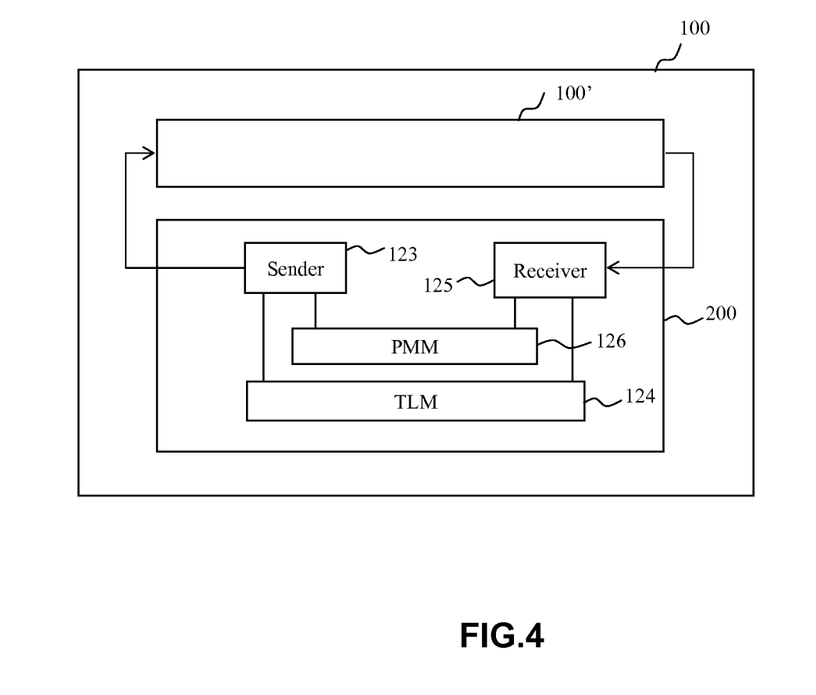
FIG. 4 is a schematic view of message delivery during the execution of a performance measurement module according to a specific embodiment of the present invention.

Referring to FIG. 4, there is shown a schematic view of message delivery during the execution of a performance measurement module 126 according to a specific embodiment of the present invention. During the testing mode, the performance measurement module 126 retrieves transaction sample data (such as REQUEST and BACKEND RESPONSE) (or "transaction data" for short) from the traffic data table (TDT) 350 and injects the retrieved transaction sample data into the partial information appliance 100'. The transaction data is sent from the sending module 123 of the test module 122 via the input/output (I/O) bus 30 to the partial information appliance 100' under test for processing. Upon completion of the processing process performed by the partial information appliance 100', the result is sent via the input/output (I/O) bus 30 back to the receiving module 125 of the test module 122, such that the result is received and recorded by the receiving module 125 of the test module 122. The performance measurement module 126 correlates the request (such as REQUEST and BACKEND RESPONSE) with a related response. Therefore, the performance (such as throughput) of the partial information appliance 100' under test can be calculated.

Figure 5A:
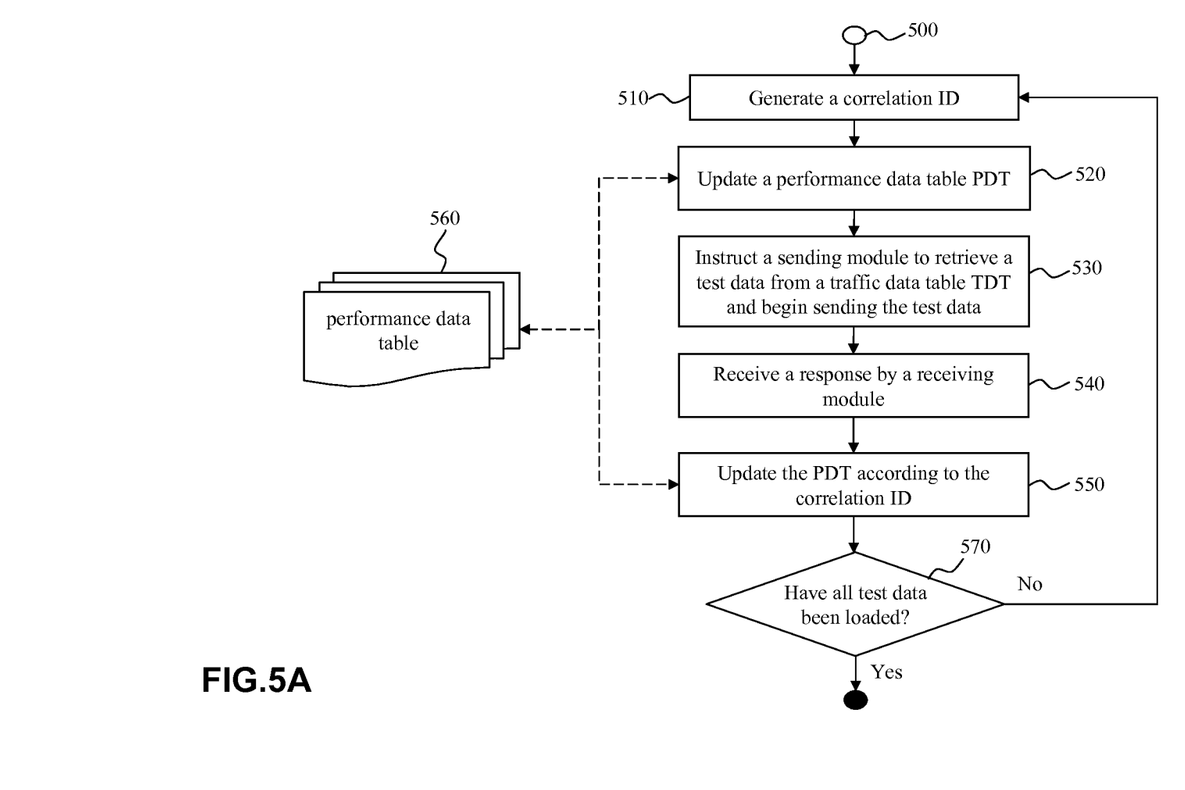
FIG. 5A is a flow chart of a method for use with a performance measurement module in a testing mode according to an embodiment of the present invention.
Figure 5B:
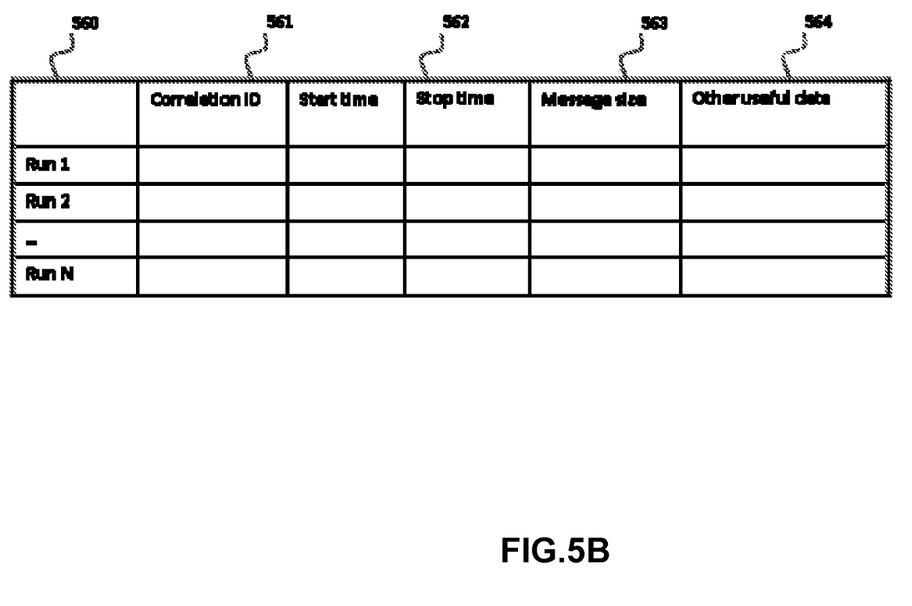
FIG. 5B is an exemplary performance data table (PDT) created by and stored in the performance measurement module according to an embodiment of the present invention.

FIG. 5A is a flow chart of the method for use with the performance measurement module 126 in the testing mode according to an embodiment of the present invention. FIG. 5B is the performance data table (PDT) 560 created by and stored in the performance measurement module 126. After initiator block 500, the process moves to step 510 where the performance measurement module 126 generates a correlation ID with regard to each injected transaction data. At step 520 the performance data table PDT 560 is updated according to the generated correlation ID and create a start time. At step 530 sending module 123 is instructed to retrieve a test data from the traffic data table (TDT) 350 and begin sending the test data to the partial information appliance 100' under test for processing the test data. The traffic receiving module 125 then receives a response, after the partial information appliance 100' under test has finished processing the test data (step 540). At step 550 related data, such as stop time, data size, and/or any other useful related metadata, is updated in the performance data table PDT 560 according to the correlation ID. For example, the other useful related metadata comprises sample data injection rate, packet loss rate, or latency. Finally, at step 570 it is determined whether all the test data have been loaded. The process continues to step 510 if the determination is negative. Otherwise, the testing mode ends if the determination is affirmative.

The performance, including the transaction quantity per second or quantity of data processed per second, of the partial information appliance 100' can be calculated by means of the start time, stop time and data size in the performance data table PDT 560. A conventional network controller of a typical network interface controls network parameters, such as the aforesaid injection rate, packet loss rate, or latency, and thereby simulates a network usage environment actually available to a client with a view of results which better meet client needs.

In addition to the aforesaid system-on-card of the stand-alone performance measurement system, the present invention can be implemented as a built-in unit of an information appliance. With regards to the input and output message contents, in addition to the aforesaid recorded transaction input and output of the normal transaction flow of the information appliance, an administrator can also upload the message contents to the standalone performance measurement system manually.

In conclusion, the present invention discloses operating a system-on-card and connecting the system-on-card to an input/output (I/O) bus of an information appliance by inserting an additional card for use with a network device of the information appliance into an expansion slot (not shown) of the information appliance, in order to simplify a process of measuring the performance of the network device and to replace a conventional resource-consuming process of creating a system infrastructure architecture for simulating client needs with a view to measure the performance of the network device more accurately and identify the optimal performance of the network device.

The foregoing preferred embodiments are provided to illustrate and disclose the technical features of the present invention and is not intended to be exhaustive or limited to the disclosure in the form disclosed. The corresponding structures, materials, acts, and equivalents of all means or step plus function elements in the claims below are intended to include any structure, material, or act for performing the function in combination with other claimed elements as specifically claimed. Many modifications and variations will be apparent to those of ordinary skill in the art without departing from the scope and spirit of the disclosure. In addition, many modifications may be made to adapt a particular system, device or component thereof to the teachings of the disclosure without departing from the essential scope thereof. The embodiment was chosen and described in order to best explain the principles of the disclosure and the practical application, and to enable others of ordinary skill in the art to understand the disclosure for various embodiments with various modifications as are suited to the particular use contemplated. Therefore, it is intended that the disclosure not be limited to the particular embodiments disclosed for carrying out this disclosure, but that the disclosure will include all embodiments falling within the scope of the appended claims.

Although the present disclosure and advantages thereof have been described in detail, it will be understood that various changes, substitution and transformation may be made thereto without departing from the spirit and scope of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-readable storage apparatus having a plurality of instructions embodied therein, wherein the plurality of instructions, when executed by a processor of a stand-alone performance measurement system (SPMS), enables the SPMS to provide the functionality of:
   receiving, at a local area network adapter of the SPMS, from an external client device, a request including transaction sample data to be processed by an information appliance, wherein the SPMS is coupled to the client via the local area network adapter, and wherein the SPMS is coupled to a high speed input/output (I/O) serial bus of the information appliance;
   in response to receiving the request:
      sending the transaction sample data to the information appliance via the high-speed I/O serial bus to initiate a test of a performance of the information appliance, wherein the SPMS simulates and replaces a physical infrastructure architecture and a network usage environment of a target environment of the external client device during the testing of the information appliance, wherein the transaction sample data includes the sample data and is stored in a traffic data table (TDT) of the SPMS;
      in response to testing the performance of the information appliance, receiving, via the high speed I/O serial bus, response data associated with the processing of the transaction sample data by the information appliance;
      calculating, based on the response data, results of the performance test of the information appliance, wherein the results include a transaction quantity per second and a quantity of data processed per second; and
      transmitting, to the external client device via the local area network adapter, the response data and a view of the results of the performance test which meet performance needs of a client associated with the external client device.

2. The computer-readable storage apparatus of claim 1, the plurality of instructions further comprising instructions that enable the SPMS to provide the functionality of:
   generating a correlation ID and update an entry of a performance data table according to the correlation ID, wherein the performance data table includes a transaction sample data size;
   in response to receiving the response data:
      updating the entry of the performance data table according to the correlation ID, wherein the updates to the performance data table include at least a start time of the transaction sample data and a stop time associated with the processing of the response data by the information appliance; and recording metadata related to the response data within the performance data table according to the correlation ID, the metadata comprising one or more of a stop time and data size of the transaction sample data and an injection rate, packet loss rate, or latency associated with the response data.

3. The computer-readable storage apparatus of claim 1, wherein the information appliance comprises a processor, a first memory, and a first I/O unit, wherein the SPMS is a system-on-card that comprises a dedicated processor, a second memory, and a second I/O unit that is connected to the high speed I/O serial bus of the information appliance, wherein the system-on-card is connected to the information appliance by inserting the system-on-card into an expansion slot of the information appliance, wherein inserting the system-on-card into an expansion slot of the information appliance interconnects the second I/O unit to the first I/O unit via the high-speed I/O serial bus.

4. The computer-readable storage apparatus of claim 1, wherein the network usage environment is simulated based on network parameters established by a network controller of a network device of the information appliance, the network parameters comprising: an injection rate of the transaction sample data, a packet loss rate of transaction sample data, and latency of the transaction sample data, and wherein the high-speed I/O serial bus is a Peripheral Component Interconnect Express (PCIe) bus.

5. The computer-readable storage apparatus of claim 1, the plurality of instructions further comprising instructions that enable the SPMS to provide the functionality of:
   sending the sample data and the request for processing of the sample data to the information appliance for processing;
   determining whether a request to a backend application for processing is present; and
   in response to determining a request to the backend application is present:
      sending the request to the backend application for processing;
      receiving a response from the backend application;
      recording the response from the backend application to the TDT, wherein the transaction sample data includes the response of the backend application; and
      sending the response from the backend application to the information appliance for processing.

6. The computer-readable storage apparatus of claim 2, wherein the metadata further includes at least one of an injection rate, packet loss rate, and latency associated with the response data.

7. The computer-readable storage apparatus of claim 1, the plurality of instructions further comprising instructions that enable the SPMS to provide the functionality of:
   determining whether a next request has been received from the external client device for the information appliance to process a next transaction sample data; and
   in response to determining the next request has been received, reinitiating the performance test of the information appliance using the next transaction sample data;
   wherein the transaction quantity per second and a quantity of data processed per second are calculated based on a start time of the transaction sample data, a stop time associated with the processing of the response data by the information appliance, and a data size of the transaction sample data.

8. An information appliance, comprising:
a first memory;
a high-speed input/output (I/O) serial bus;
a first I/O unit coupled to the high-speed I/O serial bus
a first processing unit coupled to the high-speed I/O serial bus; and
a standalone performance measurement system (SPMS) coupled to the high-speed I/O serial bus via a second I/O unit, the SPMS comprising a bus, a local area network adapter and a second memory coupled to the bus and a second processing unit having processing logic executing thereon that enables the SPMS to:
   receive, at the local area network adapter from an external client device, a request including transaction sample data to be processed by an information appliance;
   in response to receiving the request:
      send the transaction sample data to the information appliance via the high-speed I/O serial bus to initiate a test of a performance of the information appliance, wherein the SPMS simulates and replaces a physical infrastructure architecture and a network usage environment of a target environment of the external client device during the testing of the information appliance, and wherein the transaction sample data includes the sample data and is stored in a traffic data table (TDT) of the SPMS;
      in response to testing the performance of the information appliance, receive, via the high-speed I/O serial bus, response data associated with the processing of the transaction sample data by the information appliance;
      calculate, based on the response data, results of the performance test of the information appliance, wherein the results include a transaction quantity per second and a quantity of data processed per second; and
      transmit, to the external client device via the local area network adapter, the response data and a view of the results of the performance test which meet performance needs of a client associated with the external client device.

9. The information appliance of claim 8, wherein the SPMS is a built-in unit of the information appliance.

10. The information appliance of claim 8, the processing logic further comprising logic that enables the SPMS to:
   generate a correlation ID and update an entry of a performance data table according to the correlation ID, wherein the performance data table includes a transaction sample data size;
   retrieve the transaction sample data from the TDT and send the transaction sample data to the information appliance for processing;
   in response to receiving the response data:
      update the entry of the performance data table according to the correlation ID, wherein the updates to the performance data table include at least a start time of the transaction sample data and a stop time of response of the transaction sample data processed by the information appliance; and
      record metadata related to the response data within the performance data table according to the correlation ID, the metadata comprising one or more of a stop time and data size of the transaction sample data.

11. The information appliance of claim 8, wherein the SPMS is a system-on-card that is connected to the information appliance by inserting the SPMS into an expansion slot of the information appliance, wherein inserting the SPMS into an expansion slot of the information appliance interconnects the second I/O unit to the first I/O unit via the high-speed I/O serial bus, and wherein the high-speed I/O serial bus is a Peripheral Component Interconnect Express (PCIe) bus.

12. The information appliance of claim 8, the processing logic further comprising logic that enables the SPMS to:
   determine whether a next request has been received from the external client device for the information appliance to process a next transaction sample data; and
   in response to determining the next request has been received, reinitiate the performance test of the information appliance using the next transaction sample data;
   wherein:
      the network usage environment is simulated based on network parameters established by a network controller of a network device of the information appliance, the network parameters comprising: an injection rate of the transaction sample data, a packet loss rate of transaction sample data, and latency of the transaction sample data;
      the transaction quantity per second and a quantity of data processed per second are calculated based on a start time of the transaction sample data, a stop time of response of the transaction sample data processed by the information appliance, and a data size of the transaction sample data; and
      the metadata further includes at least one of an injection rate, packet loss rate, or latency associated with the response data.

13. The information appliance of claim 8, the processing logic further comprising logic that enables the SPMS to:
   send the sample data and the request for processing of the sample data to the information appliance for processing;
   determine whether a request to a backend application for processing is present; and
   in response to determining a request to the backend application is present:
      send the request to the backend application for processing;
      receive and record a response from the backend application to the TDT, wherein the transaction sample data includes the response of the backend application; and
      send the response from the backend application to the information appliance for processing.

14. A system-on-card, comprising:
   a bus;
   a memory connected to the bus;
   a local area network adapter coupled to the bus;
   an input/output (I/O) unit coupled to the bus;
   a processing unit connected to the bus; and
   processing logic executing on the processing unit that enables the system-on-card to:
      receive, at the local area network adapter from an external client device, a request including transaction sample data to be processed by an information appliance, wherein the information appliance comprises a processor, a first memory, and an information appliance I/O unit coupled to a high-speed I/O serial bus;
      record the transaction sample data to a traffic data table (TDT) of the system-on-card;
      connect the I/O unit of the system-on-card to the high-speed I/O serial bus of the information appliance;
      send transaction sample data to the information appliance via the high-speed I/O serial bus to initiate a test of a performance of the information appliance, wherein the system-on-card simulates and replaces a physical infrastructure architecture and a network usage environment of a target environment of the external client device during the testing of the information appliance, and wherein the transaction sample data includes the sample data;
      in response to testing the performance of the information appliance, receive, via the high-speed I/O serial bus, response data associated with the processing of the transaction sample data by the information appliance;
      calculate, based on the response data, results of the performance test the information appliance, wherein the results include a transaction quantity per second and a quantity of data processed per second; and
      transmit, to the external client device via the local area network adapter, the response data and a view of the results of the performance test which meet performance needs of a client associated with the external client device.

15. The system-on-card of claim 14, wherein the system-on-card is connected to the high-speed input/output (I/O) serial bus of the information appliance by inserting an additional card for use with a network device of the information appliance into an expansion slot of the information appliance, wherein inserting the system-on-card into an expansion slot of the information appliance interconnects the I/O unit to the information appliance I/O unit via the high-speed I/O serial bus.

16. The system-on-card of claim 15, wherein the high-speed I/O serial bus is a Peripheral Component Interconnect Express (PCIe) bus.

17. The system-on-card of claim 14, wherein the system-on-card is a built-in unit of the information appliance.

18. The system-on-card of claim 14, the processing logic further comprising logic that enables the system-on-card to:
   generate a correlation ID and update an entry of a performance data table according to the correlation ID, wherein the performance data table includes a transaction sample data size;
   retrieve the transaction sample data from the TDT and send the transaction sample data to the information appliance for processing;
   in response to receiving the response to the transaction sample data:
      update the entry of the performance data table according to the correlation ID, wherein the updates to the performance data table include at least a start time of the transaction sample data and a stop time of response of the transaction sample data processed by the information appliance; and
      record metadata related to the response data within the performance data table according to the correlation ID, the metadata comprising one or more of a stop time and data size of the transaction sample data and an injection rate, packet loss rate, or latency associated with the response data.

19. The system-on-card of claim 14, the processing logic further comprising logic that enables the system-on-card to:

determine whether a next request has been received from the external client device for the information appliance to process a next transaction sample data; and in response to determining the next request has been received, reinitiate the performance test of the information appliance using the next transaction sample data;

wherein:

the network usage environment is simulated based on network parameters established by a network controller of a network device of the information appliance, the network parameters comprising: an injection rate of the transaction sample data, a packet loss rate of transaction sample data, and latency of the transaction sample data;

the metadata further includes at least one of an injection rate, packet loss rate, and latency associated with the response data; and the transaction quantity per second and a quantity of data processed per second are calculated based on a start time of the transaction sample data, a stop time associated with processing of the response data by the information appliance, and a data size of the transaction sample data.

20. The system-on-card of claim 14, the processing logic further comprising logic that enables the system-on-card to:

send the sample data and the request for processing of the sample data to the information appliance for processing;

determine whether a request to a backend application for processing is present; and in response to determining a request to the backend application is present:

send the request to the backend application for processing;

receive and record a response from the backend application to the TDT, wherein the transaction sample data includes the response of the backend application; and send the response from the backend application to the information appliance for processing.

* * * * *